United States Patent
Young et al.

(10) Patent No.: US 9,264,139 B2
(45) Date of Patent: Feb. 16, 2016

(54) OPTICAL TRANSPORT NETWORK CLOCK TRANSIENT SUPPRESSION SYSTEMS AND METHODS

(71) Applicants: Alexander Gurd Young, Ottawa (CA); Sebastien Gareau, Ottawa (CA); Tim Norman, Ottawa (CA); Richard Wyatt, Ottawa (CA)

(72) Inventors: Alexander Gurd Young, Ottawa (CA); Sebastien Gareau, Ottawa (CA); Tim Norman, Ottawa (CA); Richard Wyatt, Ottawa (CA)

(73) Assignee: Ciena Corporation, Hanover, MD (US)

( * ) Notice: Subject to any disclaimer, the term of this patent is extended or adjusted under 35 U.S.C. 154(b) by 125 days.

(21) Appl. No.: 13/722,557

(22) Filed: Dec. 20, 2012

(65) Prior Publication Data
US 2013/0308943 A1    Nov. 21, 2013

Related U.S. Application Data (63) Continuation-in-part of application No. 13/476,589, filed on May 21, 2012, now Pat. No. 8,718,471, and a continuation of application No. 13/633,173, filed on Oct. 2, 2012, now Pat. No. 8,867,913.

(51) Int. Cl.
*H04Q 11/00* (2006.01)
*H04J 3/16* (2006.01)
*H04B 10/27* (2013.01)
*H04J 3/00* (2006.01)

(52) U.S. Cl.
CPC . *H04B 10/27* (2013.01); *H04J 3/00* (2013.01); *H04J 3/1652* (2013.01); *H04Q 11/0001* (2013.01); *H04J 2203/0089* (2013.01)

(58) Field of Classification Search
CPC  H04J 3/1652; H04J 2203/0089; H04L 45/42; H04L 49/00; H04L 49/354; H04L 49/70; H04Q 11/0001; H04B 10/27
USPC .......................... 370/254–350; 709/201–213
See application file for complete search history.

(56) References Cited

U.S. PATENT DOCUMENTS

| | | | |
|---|---|---|---|
| 7,602,814 B2 | 10/2009 | Meagher et al. | |
| 7,848,653 B2 | 12/2010 | Zou | |
| 7,873,073 B2 | 1/2011 | Frlan et al. | |

(Continued)

OTHER PUBLICATIONS

Silvano Friferio, et al. Realizing the Optical Transport Networking Vision in the 100 Gb/S Era, 2010, Bell Labs Technical Journal 14(4), 163-192(2010).*

(Continued)

*Primary Examiner* — Ayaz Sheikh
*Assistant Examiner* — Debebe Asefa
(74) *Attorney, Agent, or Firm* — Clements Bernard PLLC; Christopher L. Bernard; Lawrence A. Baratta, Jr.

(57) ABSTRACT

An Optical Transport Network (OTN) method, an OTN switching node method, and an OTN node utilize a "double wrapper" configuration to eliminate clock transients in OTN networks. That is, the systems and methods bury an ODU beneath another overclocked ODU thereby eliminating any interruptions due to clock transients, framing events or other disruptions. For example, an ODU2 can be mapped into an ODU2e, an ODU3 can be mapped into an ODU3e2, an ODU4 can be mapped into an ODUG or some other overclocked variant of ODU4, and the like. Specifically, ODU2e, ODU3e2, ODUG, etc. are overclocked variants of ODU2, ODU3, ODU4, etc. The systems and methods propose to use these overclocked signals to carry standard ODU signals to eliminate clock transient problems.

20 Claims, 4 Drawing Sheets

(56) References Cited

U.S. PATENT DOCUMENTS

| | | | |
|---|---|---|---|
| 7,876,760 B2 | 1/2011 | Carson | |
| 8,050,567 B2 | 11/2011 | Miller et al. | |
| 8,059,685 B2 | 11/2011 | Ghodrat et al. | |
| 8,204,382 B2* | 6/2012 | Gazier et al. | 398/115 |
| 8,259,733 B2* | 9/2012 | Conklin et al. | 370/395.51 |
| 8,412,051 B2* | 4/2013 | El-Ahmadi et al. | 398/135 |
| 8,494,363 B2* | 7/2013 | Calderon et al. | 398/43 |
| 2003/0123493 A1 | 7/2003 | Takahashi | |
| 2005/0063700 A1 | 3/2005 | Shin et al. | |
| 2006/0140225 A1 | 6/2006 | Christensen et al. | |
| 2007/0116061 A1 | 5/2007 | Meagher et al. | |
| 2007/0292129 A1 | 12/2007 | Yan et al. | |
| 2008/0075113 A1 | 3/2008 | Harley et al. | |
| 2008/0080860 A1 | 4/2008 | Katagiri | |
| 2008/0219661 A1 | 9/2008 | Lanzone et al. | |
| 2009/0022497 A1 | 1/2009 | Mateosky et al. | |
| 2009/0086767 A1 | 4/2009 | Li | |
| 2009/0257756 A1 | 10/2009 | Fukumitsu | |
| 2010/0054731 A1 | 3/2010 | Oltman et al. | |
| 2010/0080245 A1 | 4/2010 | Kisaka et al. | |
| 2010/0098432 A1 | 4/2010 | Ono et al. | |
| 2010/0172645 A1 | 7/2010 | Liu et al. | |
| 2010/0226652 A1 | 9/2010 | Vissers et al. | |
| 2010/0272438 A1 | 10/2010 | Conklin et al. | |
| 2011/0032950 A1 | 2/2011 | Harley et al. | |
| 2011/0200051 A1 | 8/2011 | Rivaud et al. | |
| 2011/0243565 A1 | 10/2011 | Wolf | |
| 2012/0155874 A1 | 6/2012 | Lin et al. | |
| 2012/0201535 A1 | 8/2012 | Loprieno et al. | |

OTHER PUBLICATIONS

Josef Roese et al, Optical Transport Network Evolved With 100 Gigabit Ethernet, IEEE Communication Magazine, Mar. 2010.*

Papadimitriou Dimitri; EURESCOM "Enabling Generalized MPLS Control for G.709 Optical Transport Networks"; Eurescom—Oct. 2001.

Jing Wu and H.T. Mouftah; "Integrated Shim Layer"; Paper—Department of Electrical and Computer Engineering, Queen's University, Kingston, Ontario CA—(©)2000 Optical Society of America.

Steve Trowbridge; Understanding OTN Optical Transport Network (G.709); Alcatel-Lucent—Mar. 9, 2010.

Germano Gasparini, Gert Grammel, Dimitri Papadimitriou (Alcatel); "CCAMP Working Group: Internet Draft—"Traffic Engineering Extensions to OSPF and ISIS for GMPLS Control of G.709 Optical Transport Networks; http://ietfreport.isocorg/all-ids/draft—Mar. 30, 2009.

* cited by examiner

OPTICAL TRANSPORT NETWORK CLOCK TRANSIENT SUPPRESSION SYSTEMS AND METHODS

CROSS-REFERENCE TO RELATED APPLICATION(S)

This application is a continuation-in-part of co-pending U.S. patent application Ser. No. 13/476,589 filed May 21, 2012, and entitled "OPTICAL TRANSPORT NETWORK TRANSIENT MANAGEMENT SYSTEMS AND METHODS," and co-pending U.S. patent application Ser. No. 13/633,173 filed Oct. 2, 2012 and entitled "OPTICAL TRANSPORT NETWORK HIGH ORDER MAPPING SYSTEMS AND METHODS," the contents of each are incorporated in full by reference herein.

FIELD OF THE DISCLOSURE

The present disclosure relates generally to optical networking systems and methods. More particularly, the present disclosure relates to Optical Transport Network (OTN) clock transient suppression systems and methods utilizing a so-called "double wrapper" configuration in OTN.

BACKGROUND OF THE DISCLOSURE

Optical Transport Network (OTN) includes a set of Optical Network Elements (ONE) connected by optical fiber links, able to provide functionality of transport, multiplexing, switching, management, supervision and survivability of optical channels carrying client signals. OTN is defined, inter alia, in ITU-T Recommendations G.709 (December/2012) "Interfaces for the Optical Transport Network (OTN)," G.798 (October/2010) "Characteristics of optical transport network hierarchy equipment functional blocks," G.805 (March/2000) "Generic functional architecture of transport networks," G.872 (October/2012) "Architecture of optical transport networks," G.798.1 (April/2011) "Types and characteristics of OTN equipment," G.7710 (February/2012) "Common equipment management function requirements," G.7714.1 (April/2003) "Protocol for automatic discovery in SDH and OTN networks," G.873.1 (July/2011) "OTN Linear Protection," and G.873.2 (April/2012) "ODUk Shared Ring Protection," the contents of each are incorporated by reference herein.

Optical (i.e., transport) networks and the like (e.g., wavelength division multiplexing (WDM), Synchronous Optical Network (SONET), Synchronous Digital Hierarchy (SDH), Optical Transport Network (OTN), Ethernet, and the like) at various layers are deploying control plane systems and methods. Control plane systems and methods provide automatic allocation of network resources in an end-to-end manner. Exemplary control planes may include Automatically Switched Optical Network (ASON) as defined in G.8080/Y.1304, Architecture for the automatically switched optical network (ASON) (February/2005), the contents of which are herein incorporated by reference; Generalized Multi-Protocol Label Switching (GMPLS) Architecture as defined in Request for Comments (RFC): 3945 (October/2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections there between. It is essential for the operation of control planes to have control plane signaling and Operations, Administration, Maintenance, and Provisioning (OAM&P) connectivity between nodes.

Clock adjustments in an OTN context can be problematic. For example, when switching from Optical channel Data Unit j (ODUj) to another synchronous or asynchronous source (or vise-versa), a clock transient and frame slip are experienced and alarms are raised unless suppressed by alarm hold-off and conditioning. During this time, OAM&P and control plane signaling is unavailable until recovery is possible. If nothing is done, then user experience spurious alarms when the ODUj service is affected. It has also been determined that these transients can cause cascading glitches in the OTN network. This has been explored in commonly assigned U.S. patent application Ser. No. 13/476,589 filed May 21, 2012 and entitled "OPTICAL TRANSPORT NETWORK TRANSIENT MANAGEMENT SYSTEMS AND METHODS," the contents of which are incorporated by reference herein. However, conventional solutions only seek to mitigate problems, not eliminate them.

BRIEF SUMMARY OF THE DISCLOSURE

In an exemplary embodiment, an Optical Transport Network (OTN) method includes transmitting an Optical channel Data Unit (ODU) signal between a pair of OTN switching nodes within another overclocked OTN signal acting as a wrapper; performing control plane signaling and exchange of Operations, Administration, Maintenance, and Provisioning (OAM&P) data between the pair of OTN switching nodes using overhead associated with the overclocked OTN signal; and, responsive to a clock transient on the ODU signal, frame alignment glitches, maintaining the control plane signaling and the OAM&P data through the overhead associated with the overclocked OTN signal in a double wrapper configuration. Optionally, the ODU signal includes an ODU2 and the overclocked signal includes an ODU2e. Alternatively, the ODU signal includes an ODU3 and the overclocked signal includes an ODU3e2. Also, the ODU signal can include an ODU4 and the overclocked signal can include an ODUG. The OTN method can further include mapping the ODU signal into the overclocked OTN signal utilizing Generic Mapping Protocol (GMP) or a variant thereof. The ODU signal can include a High Order (HO) signal mapped into the overclocked OTN signal. The ODU signal is hidden within the overclocked OTN signal insulating the control plane signaling and the OAM&P data from any clock transients experienced or other framing events on the ODU signal due to the ODU signal switching.

In another exemplary embodiment, an OTN switching node method includes receiving an Optical channel Data Unit (ODU) signal within an overclocked OTN signal at an OTN switching node; processing overhead from the overclocked OTN signal; demapping the ODU signal from the overclocked OTN signal; processing the ODU signal; mapping the processed ODU signal into another overclocked OTN signal; and transmitting the another overclocked OTN signal to another OTN switching node. The OTN switching node method can further include processing the overhead from the overclocked OTN signal for control plane signaling and Operations, Administration, Maintenance, and Provisioning (OAM&P) data. Optionally, the ODU signal includes an ODU2 and the overclocked signal includes an ODU2e. Alternatively, the ODU signal includes an ODU3 and the overclocked signal includes an ODU3e2. Also, the ODU signal can include an ODU4 and the overclocked signal can include an ODUG. The OTN switching node method can further include performing the mapping step and the demapping step utilizing Generic Mapping Protocol (GMP) or a variant thereof. The ODU signal can include a High Order (HO) signal mapped into the overclocked OTN signal. The ODU signal is hidden within the overclocked OTN signal insulating the control plane signaling and the OAM&P data from any clock transients experienced on the ODU signal due to the ODU signal switching.

In yet another exemplary embodiment, an OTN node includes at least one line module communicatively coupled to another OTN node; a switch communicatively coupled to the at least one line module; and a controller communicatively coupled to the at least one line module and the switch; wherein the at least one line module operates in a double wrapper configured where an Optical channel Data Unit (ODU) signal is transmitted to the another OTN node in an overclocked OTN signal; and wherein the controller is configured to perform control plane signaling and exchange of Operations, Administration, Maintenance, and Provisioning (OAM&P) data using overhead associated with the overclocked OTN signal to prevent interruptions based on any clock transients or framing events associated with the ODU signal. Optionally, the ODU signal includes an ODU2 and the overclocked signal includes an ODU2e. Alternatively, the ODU signal includes an ODU3 and the overclocked signal includes an ODU3e2. Also, the ODU signal can include an ODU4 and the overclocked signal can include an ODUG. The at least one line module can be configured to map and demap the ODU signal utilizing Generic Mapping Protocol (GMP) or a variant thereof.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, OTN clock transient suppression systems and methods utilize a "double wrapper" configuration to eliminate the effects of clock transients or framing events in OTN networks. That is, the systems and methods bury an ODU signal beneath another ODU signal (i.e., an overclocked OTN signal) thereby eliminating any interruptions. For example, an ODU2 can be mapped into an ODU2e, an ODU3 can be mapped into an ODU3e2, an ODU4 can be mapped into an ODUG or some other overclocked variant of ODU4, and the like. Specifically, ODU2e, ODU3e2, ODUG, etc. are overclocked variants of ODU2, ODU3, ODU4, etc. The original intent in these overclocked OTN signals is to carry address higher rate signals such as 10 Gigabit Ethernet LAN PHY signals and the like. The systems and methods propose to use these overclocked OTN signals to carry standard ODU signals to eliminate clock transient or framing problems. The systems and methods include a double mapping and can use the Generic Mapping Procedure (GMP) schemes or Asynchronous Mapping Procedure (AMP) schemes defined in ITU-T Recommendation G.709 or variants thereof. In context of this double mapping, a control plane can utilize outer overhead in the overclocked OTN signal thereby being insulating from any events experience on an inner ODU signal. In this manner, events such as clock transients are eliminated as any transient experienced by the inner ODU signal does not interrupt OAM&P on the outer overclocked OTN signal. Specifically, the inner ODU signal is hidden within the outer overclocked OTN signal insulating control plane signaling and other data from any clock transients or framing events experienced on the inner ODU signal.

Figure 1:
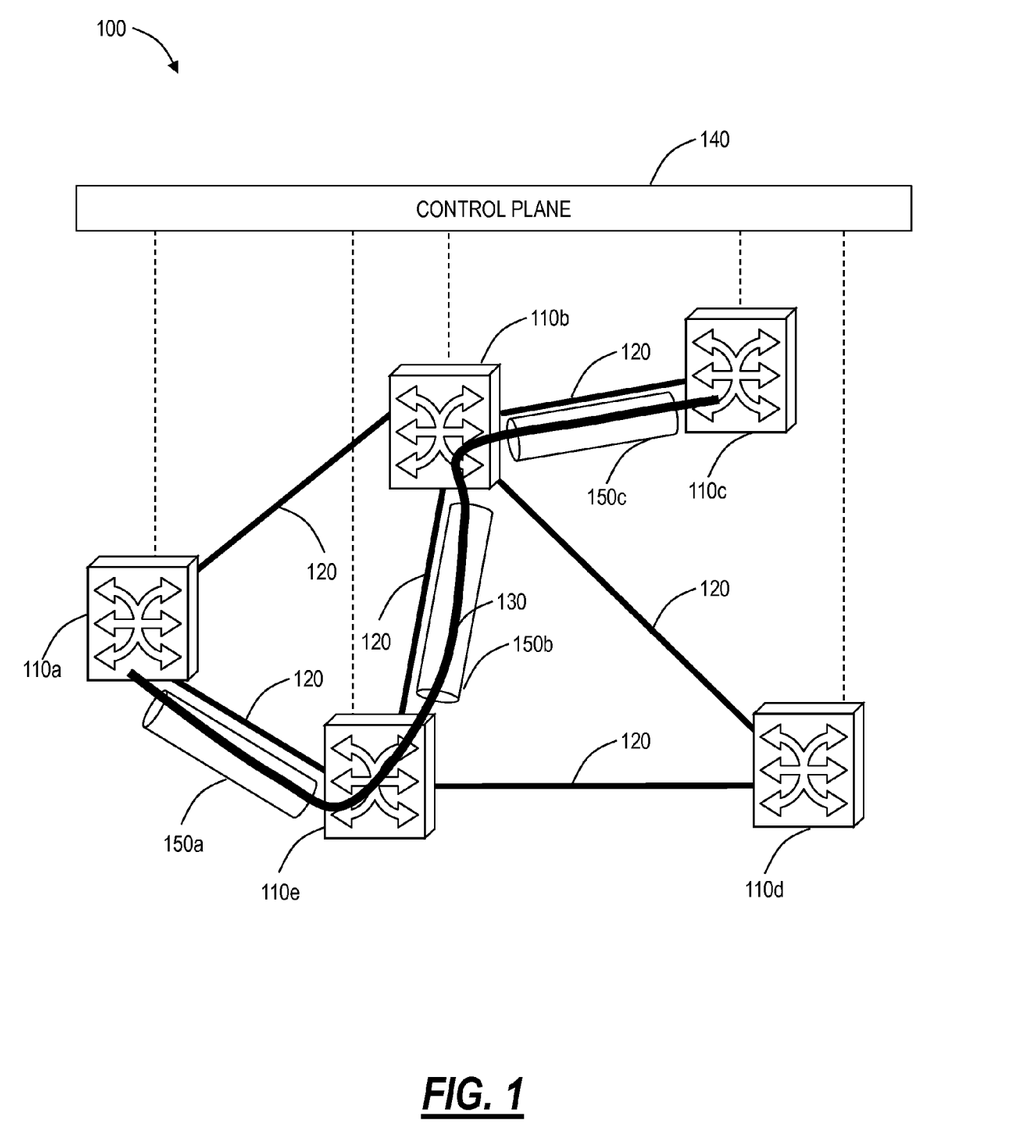
FIG. 1 is a network diagram of an exemplary OTN network with five interconnected nodes and a connection transported over the network utilizing a double wrapper configuration.
Figure 4:
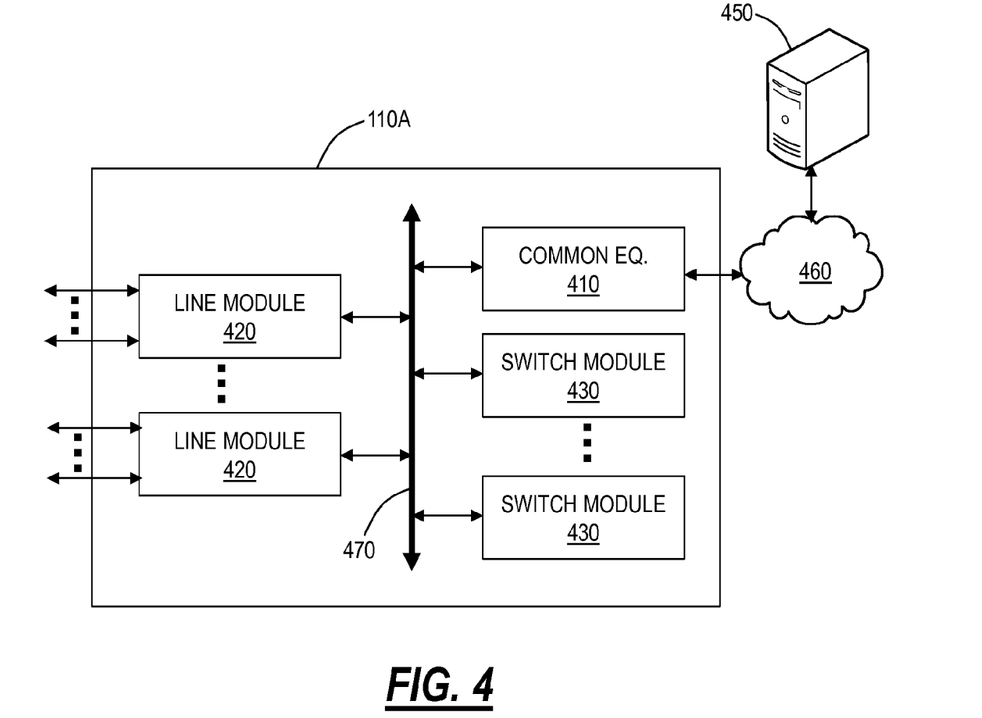
FIG. 4 is a block diagram of an exemplary node for use with the methods and systems described herein.

Referring to FIG. 1, in an exemplary embodiment, a network diagram illustrates an exemplary OTN network 100 with five interconnected nodes 110a, 110b, 110c, 110d, 110e. The nodes 110 are interconnected through a plurality of links 120. The nodes 110 communicate with one another over the links 120 through OTN. The nodes 110 can be network elements which include a plurality of ingress and egress ports forming the links 120. An exemplary node 110A is illustrated in FIG. 4. The network 100 includes a connection 130 with ingress/egress at the nodes 110a, 110c and intermediate nodes 110b, 110e. The connection 130 can be an OTUk connection with an ODUk or ODUj contained therein, k, j=0, 1, 2, 2e, 3, 3e2, 4, flex, etc. The connection 130 can be a subnetwork connection (SNC). The ODU can be a high order (HO) ODUk or a low order (LO) ODUj. In the HO case, there is one to one container mapping, i.e. a client in the connection 130 takes the entire payload throughput of the connection 130, e.g. 10GbE/OC-192/STM-64 into an ODU2. In this case, the an OTUk for the connection 130 needs framing to be derived from the HO ODUk contained therein as per OTN standards, i.e. the connection 130 receives timing from the client. In the LO case, the connection 130 is multiplexed from various clients such as an ODTUG Optical channel Data Tributary Unit Group (ODTUG), and the OTUk frame can be timed based on a local system clock for each of the nodes 110.

The network 100 can include a control plane 140 operating on and/or between the nodes 110a, 110b, 110c, 110d. The control plane 140 includes software, processes, algorithms, etc. that control configurable features of the network 100, such as automating discovery of the nodes 110, capacity on the links 120, port availability on the nodes 110, connectivity between ports; dissemination of topology and bandwidth information between the nodes 110; calculation and creation of paths for connections; network level protection and restoration; and the like. In an exemplary embodiment, the control plane 140 can utilize ASON, GMPLS, OSRP, or the like. Those of ordinary skill in the art will recognize the network 100 and the control plane 140 can utilize any type control plane for controlling the nodes 110 and establishing connections therebetween. The OTN clock transient suppression systems and methods can be implemented with and/or by the control plane or implemented separately.

The network 100 includes overclocked OTN signals 150a, 150b, 150c carrying the connection 130 between the nodes 110a, 110e, 110b, 110c. Specifically, the overclocked OTN signal 150a is provisioned between the nodes 110a, 110e, the overclocked OTN signal 150b is provisioned between the nodes 110e, 110b, and the overclocked OTN signal 150c is provisioned between the nodes 110b, 110c. The overclocked OTN signal 150a, 150b, 150c is a HO OTN signal that contains the connection 130 which can be either a HO or LO signal. Importantly, the control plane 140 utilizes overhead associated with the overclocked OTN signal 150a, 150b, 150c for communication. As such, clock transients or disruptions experienced on the connection 130 do not disrupt the control plane 140 operation. This configuration with the connection 130 within the overclocked OTN signal 150a, 150b, 150c can be referred to as a "double wrapper" or "double mapping."

The overclocked OTN signal 150a, 150b, 150c can include, without limitation, an ODU2e for an ODU2, an ODU3e2 for an ODU3, an ODUG for an ODU4, etc. Also, the overclocked signal 150a, 150b, 150c can include a proprietary overclocked OTN signal. A discussion of proprietary overclocked OTN signals and mapping HO to HO signals is described in commonly assigned U.S. patent application Ser. No. 13/633,173 (same inventors as the present invention) filed Oct. 2, 2012 and entitled "OPTICAL TRANSPORT NETWORK HIGH ORDER MAPPING SYSTEMS AND METHODS," the contents of which are incorporated by reference herein. It is noted that traditionally the overclocked OTN signal 150a, 150b, 150c was provided to support excess bandwidth such as with LAN PHY signals. However, it has been determined that the overclocked OTN signal 150a, 150b, 150c can also be used to support standard ODU signals providing a mechanism to eliminate clock transients on the standard ODU signals.

Figure 2:
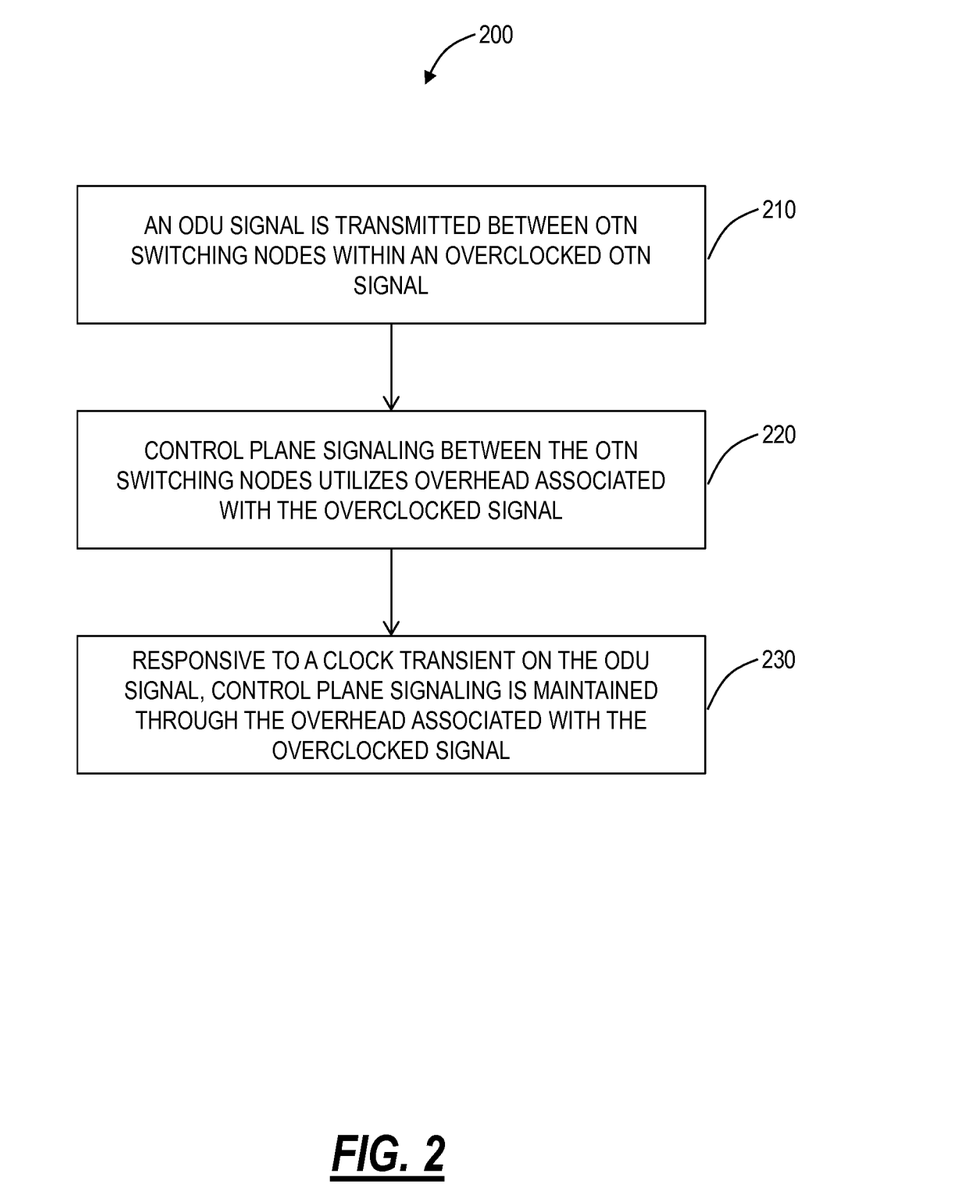
FIG. 2 is a flowchart of a double wrapper method for transporting ODU signals without experiencing clock transients thereon.

Referring to FIG. 2, in an exemplary embodiment, a flowchart illustrates a double wrapper method 200 for transporting ODU signals without experiencing disruptions, framing events or clock transients thereon. The double wrapper method 200 can be used in the network 100 with the nodes 110 or the like. The double wrapper method 200 includes transmitting an ODU signal between OTN switching nodes within an overclocked OTN signal (step 210). The OTN switching nodes can include the nodes 110 in the network 100 or any other network element capable of performing OTN level switching. The overclocked OTN signal can include any variation of an overclocked OTN signal such as, without limitation, ODU2e, ODU3e2, ODUG, etc. The mapping of the ODU signal into the overclocked signal can be via GMP or a variation thereof. The double wrapper method 200 includes control plane signaling between the OTN switching nodes utilizing overhead associated with the overclocked signal (step 220). Also, the double wrapper method 200 could use the overhead associated with the overclocked signal for any OAM&P function if a control plane is not used. In this manner, the control plane signaling and the OAM&P is tolerant to any clock transients or framing events on the underlying ODU signal. As such, responsive to a clock transient on the ODU signal, the control plane signal or other OAM&P functions are maintained through the overhead associated with the overclocked signal (step 230).

Figure 3:
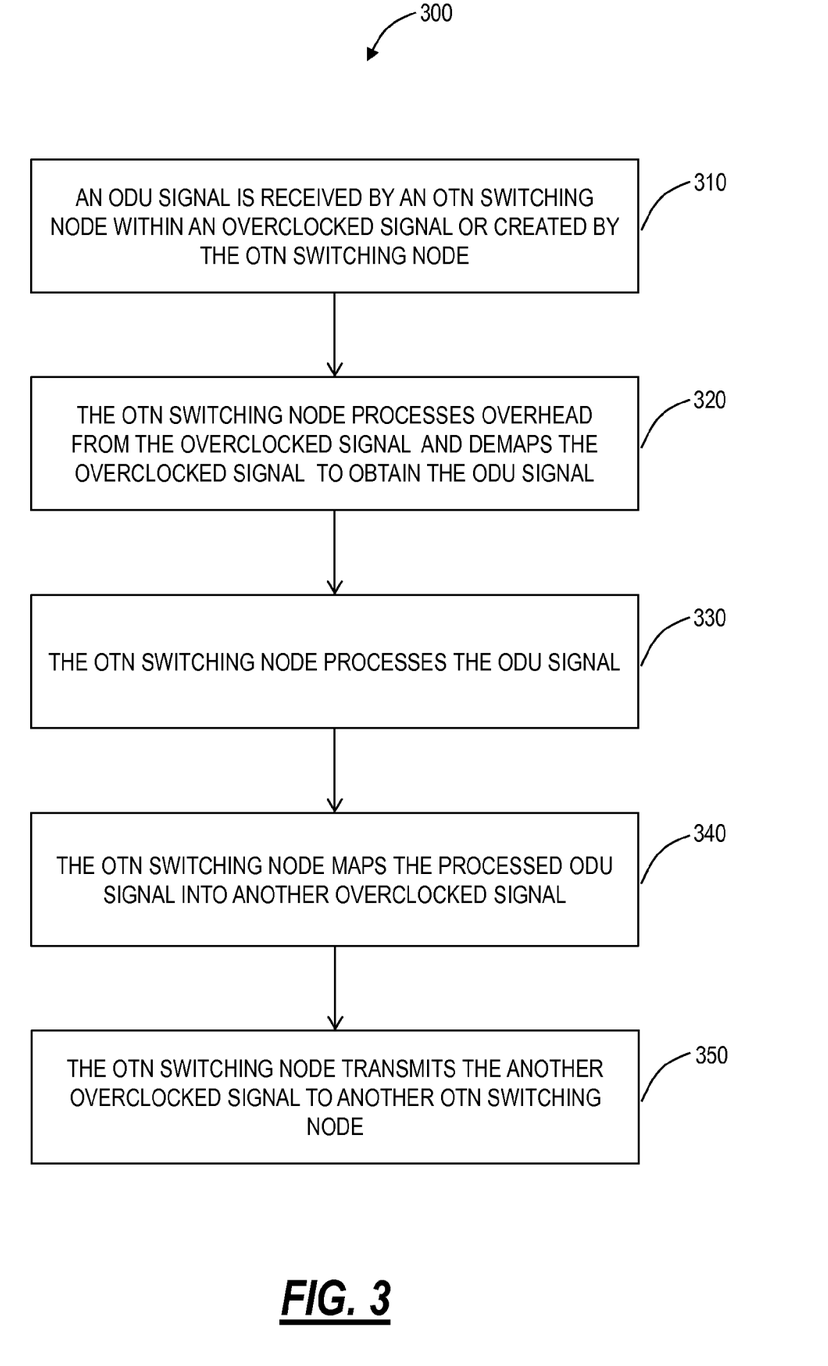
FIG. 3 is a flowchart of an OTN switching node method for interfacing ODU signals without experiencing clock transients thereon.

Referring to FIG. 3, in an exemplary embodiment, a flowchart illustrates an OTN switching node method 300 for interfacing ODU signals without experiencing clock transients thereon. The OTN switching node method 300 can be used in the network 100 on one of the nodes 110 or the like. The OTN switching node method 300 can be used with the double wrapper method 200 and focuses on operations performed at one of the OTN switching nodes in implementing the double wrapper method 200. The OTN switching node method 300 includes an ODU signal being received by an OTN switching node within an overclocked signal or created by the OTN switching node (step 310). For example, with reference back to FIG. 1, the node 110e can be said to receive the overclocked signal 150a with the connection 130 contained therein as the ODU signal. As for creating the ODU signal, the node 110a can be said to create the connection 130 as the ODU signal. For example, the node 110a can create the connection 130 based on tributaries or the like.

If the OTN switching node receives the ODU signal within the overclocked signal, such as for the node 110e, the OTN switching node processes overhead from the overclocked signal and demaps the overclocked signal to obtain the ODU signal (step 320). As described herein, the OTN switching node utilizes overhead from the overclocked signal for control plane signaling and other OAM&P functions. Exemplary other OAM&P functions may include Tandem Connection Monitoring (TCM), traces, and the like. Subsequent to demapping the overclocked signal, the OTN switching node processes the ODU signal (step 330). The processing of the ODU signal can include mapping, multiplexing, switching, etc. That is, the OTN switching node ultimately performs whatever functionality on the ODU signal as is required with the overclocking signal acting as a double wrapper during transport between adjacent OTN switching nodes. For example, the node 110e is switching the ODU signal from the node 110a to the node 110b. The node 110a is switching the ODU signal to the node 110e, etc.

The OTN switching node maps the processed ODU signal into another overclocked signal (step 340). Once processing is complete, the ODU signal is mapped into another overclocked signal with its associated overhead for transmission to another OTN switching node. For example, the node 110e can perform processing to switch the ODU signal from the node 110a to the node 110b and then map the processed ODU signal to another overclocked signal for transport to the node 110b. Finally, the OTN switching node transmits the another overclocked signal to another OTN switching node (step 350). For example, the node 110e transmits the connection 130 via the overclocked signal 150a to the node 110b.

Referring to FIG. 4, in an exemplary embodiment, a block diagram illustrates an exemplary node 110A for use with the methods and systems described herein. In an exemplary embodiment, the exemplary node 110A can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and 2 consolidation. In another exemplary embodiment, the node 110A can be any of an OTN add/drop multiplexer (ADM), a SONET/SDH/OTN ADM, a multi-service provisioning platform (MSPP), a digital cross-connect (DCS), an optical cross-connect, an optical switch, a router, a switch, a wavelength division multiplexing (WDM) terminal, an access/aggregation device, etc. That is, the node 110A can be any digital system with ingress and egress digital signals and switching therebetween of channels, timeslots, tributary units, etc. utilizing OTN, SONET, SDH, etc. While the node 110A is generally shown as an optical network element, the systems and methods contemplated for use with any switching fabric, network element, or network based thereon.

In an exemplary embodiment, the node 110A includes common equipment 410, one or more line modules 420, and one or more switch modules 430. The common equipment 410 can include power; a control module; operations, administration, maintenance, and provisioning (OAM&P) access; user interface ports; and the like. The common equipment 410 can connect to a management system 450 through a data communication network 460. The management system 450 can include a network management system (NMS), element management system (EMS), or the like. Additionally, the common equipment 410 can include a control plane processor configured to operate a control plane as described herein. The node 110A can include an interface 470 for communicatively coupling the common equipment 410, the line modules 420, and the switch modules 430 therebetween. For example, the interface 470 can be a backplane, mid-plane, a bus, optical or electrical connectors, or the like. The line modules 420 are configured to provide ingress and egress to the switch modules 430 and external to the node 110A. In an exemplary embodiment, the line modules 420 can form ingress and egress switches with the switch modules 430 as center stage switches for a three-stage switch, e.g. a three stage Clos switch. Other configurations and/or architectures are also contemplated. The line modules 420 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc.

Further, the line modules 420 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, and any rate in between. The line modules 420 can include wavelength division multiplexing interfaces, short reach interfaces, and the like, and can connect to other line modules 420 on remote network elements, end clients, edge routers, and the like. From a logical perspective, the line modules 420 provide ingress and egress ports to the node 110A, and each line module 420 can include one or more physical ports. The switch modules 430 are configured to switch channels, timeslots, tributary units, etc. between the line modules 420. For example, the switch modules 430 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 630 can include both Time Division Multiplexed (TDM) (i.e., circuit switching) and packet switching engines. The switch modules 430 can include redundancy as well, such as 1:1, 1:N, etc. In an exemplary embodiment, the switch modules 430 provide OTN, SONET, or SDH switching.

Note, the line modules 420 and the switch modules 430 are configured to support the overclocked signals 150 as well as mapping/demapping of the connection 130 into the overclocked signals 150. For example, the line modules 420 can include optical modems and other electronic and optical components to support transmission of the overclocked signals 150. In an exemplary embodiment, mapping/demapping of the overclocked signals 150 can be performed by the line modules 420. In another exemplary embodiment, mapping/demapping of the overclocked signals 150 can be performed by the switch modules 430. In yet another exemplary embodiment, mapping/demapping of the overclocked signals 150 can be performed by a combination of the line modules 420 and the switch modules 430. Other variations are also contemplated.

Those of ordinary skill in the art will recognize the node 110A can include other components which are omitted for illustration purposes, and that the systems and methods described herein are contemplated for use with a plurality of different network elements with the node 110A presented as an exemplary type of network element. For example, in another exemplary embodiment, the node 110A may not include the switch modules 430, but rather have the corresponding functionality in the line modules 420 (or some equivalent) in a distributed fashion. For the node 110A, other architectures providing ingress, egress, and switching therebetween are also contemplated for the systems and methods described herein. In general, the systems and methods described herein contemplate use with any network element providing switching of OTN, SONET, SDH, etc. channels, timeslots, tributary units, wavelengths, etc. Furthermore, the node 110A is merely presented as one exemplary node 110 for the systems and methods described herein. Those of ordinary skill in the art will recognize the systems and methods can be used for practically any type of node 110 that may experience OTN clock transients.

Figure 5:
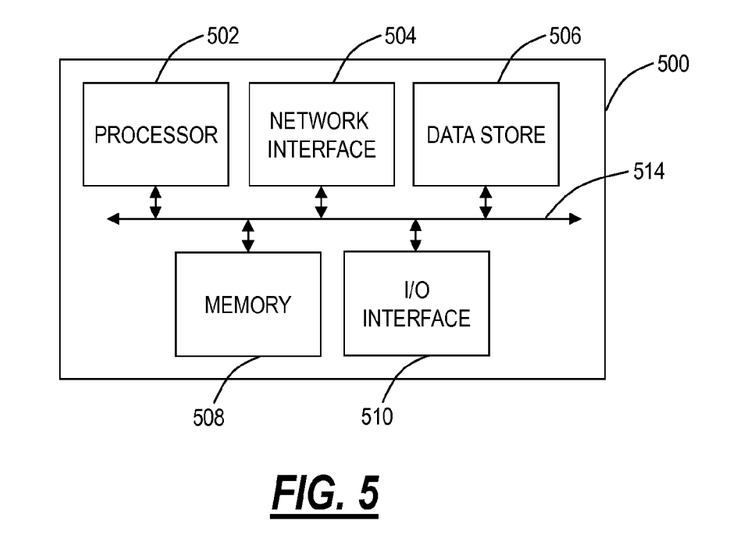
FIG. 5 is a block diagram of a controller to provide control plane processing and/or operations, administration, maintenance, and provisioning (OAM&P) for the node of FIG. 4.

Referring to FIG. 5, in an exemplary embodiment, a block diagram illustrates a controller 500 to provide control plane processing and/or operations, administration, maintenance, and provisioning (OAM&P) for the node 110A. The controller 500 can be part of common equipment, such as common equipment 410 in the node 110A. The controller 500 can include a processor 502 which is hardware device for executing software instructions such as operating the control plane. The processor 502 can be any custom made or commercially available processor, a central processing unit (CPU), an auxiliary processor among several processors associated with the controller 500, a semiconductor-based microprocessor (in the form of a microchip or chip set), or generally any device for executing software instructions. When the controller 500 is in operation, the processor 502 is configured to execute software stored within memory, to communicate data to and from the memory, and to generally control operations of the controller 500 pursuant to the software instructions. The controller 500 can also include a network interface 504, a data store 506, memory 508, an I/O interface 510, and the like, all of which are communicatively coupled therebetween and with the processor 502.

The network interface 504 can be used to enable the controller 500 to communicate on a network, such as to communicate control plane information to other controllers, to the management system 460, and the like. The network interface 504 can include, for example, an Ethernet card (e.g., 10BaseT, Fast Ethernet, Gigabit Ethernet) or a wireless local area network (WLAN) card (e.g., 802.11a/b/g). The network interface 504 can include address, control, and/or data connections to enable appropriate communications on the network. The data store 506 can be used to store data, such as control plane information, provisioning data, OAM&P data, etc. The data store 506 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 506 can incorporate electronic, magnetic, optical, and/or other types of storage media. The memory 508 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 508 may incorporate electronic, magnetic, optical, and/or other types of storage media. Note that the memory 508 can have a distributed architecture, where various components are situated remotely from one another, but may be accessed by the processor 502.

The I/O interface 510 includes components for the controller 500 to communicate to other devices in a node, such as through the local interface 514. Further, the I/O interface 510 includes components for the controller 500 to communicate with the other nodes, such as using overhead associated with the overclocked signal. The components (502, 504, 506, 508, 510) are communicatively coupled via a local interface 514. The local interface 514 and the I/O interface 510 can be, for example but not limited to, one or more buses or other wired or wireless connections, as is known in the art. The local interface 514 and the I/O interface 510 can have additional elements, which are omitted for simplicity, such as controllers, buffers (caches), drivers, repeaters, and receivers, among many others, to enable communications. Further, the local interface 514 and the I/O interface 510 can include address, control, and/or data connections to enable appropriate communications among the aforementioned components.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An Optical Transport Network (OTN) method, comprising:
   transmitting an Optical channel Data Unit (ODU) signal between a pair of OTN switching nodes mapped within an overclocked OTN signal, wherein the ODU signal is an ODUn with n=2, 3, or 4 and the overclocked OTN signal is a High Order (HO) overclocked variant of the ODUn;
   performing one or more of control plane signaling and exchange of Operations, Administration, Maintenance, and Provisioning (OAM&P) data between the pair of OTN switching nodes using overhead associated with the overclocked OTN signal, wherein the one or more of the control plane signaling and the OAM&P data is for the ODU signal; and
   responsive to a clock transient, framing events, or other disruptions on the ODU signal affecting the control plane signaling, maintaining the one or more of control plane signaling and OAM&P data for the ODU signal through the overhead associated with the overclocked OTN signal in a double mapping configuration, wherein the double mapping configuration includes the ODU signal mapped in the overclocked OTN signal such that the overclocked OTN signal carries the one or more of the control plane signaling and the OAM&P data for the ODU signal.

2. The OTN method of claim 1, wherein the ODU signal comprises an ODU2 and the overclocked signal comprises an ODU2e.

3. The OTN method of claim 1, wherein the ODU signal comprises an ODU3 and the overclocked signal comprises an ODU3e2.

4. The OTN method of claim 1, wherein the ODU signal comprises an ODU4 and the overclocked signal comprises an ODUG.

5. The OTN method of claim 1, further comprising:
   mapping the ODU signal into the overclocked OTN signal utilizing Generic Mapping Protocol (GMP) or a variant thereof.

6. The OTN method of claim 1, wherein the ODU signal comprises a High Order (HO) signal.

7. The OTN method of claim 1, wherein the ODU signal is hidden within the overclocked OTN signal insulating the control plane signaling and OAM&P data from any clock transients, framing events or other disruptions experienced on the ODU signal due to the ODU signal switching from ODUj to ODUk or vice versa.

8. An Optical Transport Network (OTN) switching node method, comprising:
   receiving an Optical channel Data Unit (ODU) signal within an overclocked OTN signal at an OTN switching node, wherein the ODU signal is an ODUn with n=2, 3, or 4 and the overclocked OTN signal is a High Order (HO) overclocked variant of the ODUn;
   processing overhead from the overclocked OTN signal;
   demapping the ODU signal from the overclocked OTN signal;
   processing the ODU signal;
   mapping the processed ODU signal into another overclocked OTN signal, wherein the processed ODU signal is an ODUn with n=2, 3, or 4 and the other overclocked OTN signal is a High Order (HO) overclocked variant of the ODUn; and
   transmitting the other overclocked OTN signal to another OTN switching node.

9. The OTN switching node method of claim 8, further comprising:
processing the overhead from the overclocked OTN signal for one or more of control plane signaling and Operations, Administration, Maintenance, and Provisioning (OAM&P) data, wherein the one or more of the control plane signaling and the OAM&P data is for the ODU signal.

10. The OTN switching node method of claim 8, wherein the ODU signal comprises an ODU2 and the overclocked signal comprises an ODU2e.

11. The OTN switching node method of claim 8, wherein the ODU signal comprises an ODU3 and the overclocked signal comprises an ODU3e2.

12. The OTN switching node method of claim 8, wherein the ODU signal comprises an ODU4 and the overclocked signal comprises an ODUG.

13. The OTN switching node method of claim 8, further comprising:
performing the mapping step and the demapping step utilizing Generic Mapping Protocol (GMP) or a variant thereof.

14. The OTN switching node method of claim 8, wherein the ODU signal comprises a High Order (HO) signal.

15. The OTN switching node method of claim 8, wherein the ODU signal is hidden within the overclocked OTN signal insulating the one or more of control plane signaling and OAM&P data from any clock transients experienced on the ODU signal due to the ODU signal switching from ODUj to another source or vice versa.

16. An Optical Transport Network (OTN) node, comprising:
at least one line module communicatively coupled to another OTN node;
a switch communicatively coupled to the at least one line module; and
a controller communicatively coupled to the at least one line module and the switch;
wherein the at least one line module operates in a double mapping configuration where an Optical channel Data Unit (ODU) signal is transmitted to the other OTN node in an overclocked OTN signal, wherein the ODU signal is an ODUn with n=2, 3, or 4 and the overclocked OTN signal is a High Order (HO) overclocked variant of the ODUn; and
wherein the controller is configured to perform one or more of control plane signaling and exchange of Operations, Administration, Maintenance, and Provisioning (OAM&P) data using overhead associated with the overclocked OTN signal to prevent interruptions associated with the ODU signal, wherein the one or more of the control plane signaling and the OAM&P data is for the ODU signal.

17. The OTN node of claim 16, wherein the ODU signal comprises an ODU2 and the overclocked signal comprises an ODU2e.

18. The OTN node of claim 16, wherein the ODU signal comprises an ODU3 and the overclocked signal comprises an ODU3e2.

19. The OTN node of claim 16, wherein the ODU signal comprises an ODU4 and the overclocked signal comprises an ODUG.

20. The OTN node of claim 16, wherein the at least one line module is configured to map and demap the ODU signal utilizing Generic Mapping Protocol (GMP) or a variant thereof.

* * * * *